May 25, 1954     L. GOULD     2,679,188
DEPTH ILLUSION ATTACHMENT DEVICE FOR OPTICAL PROJECTORS
Filed Aug. 30, 1949
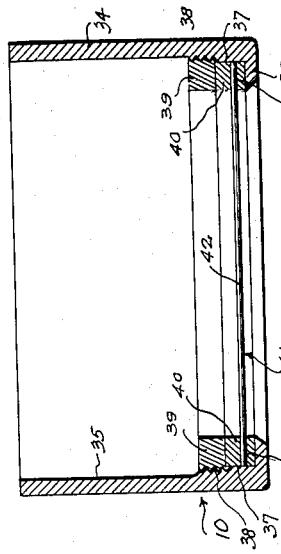
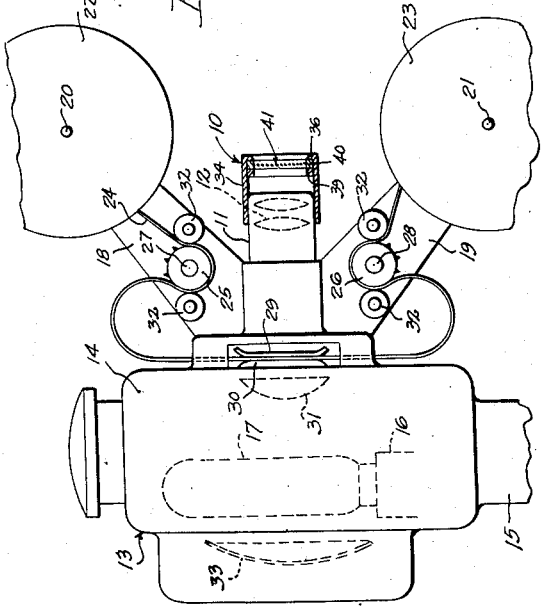
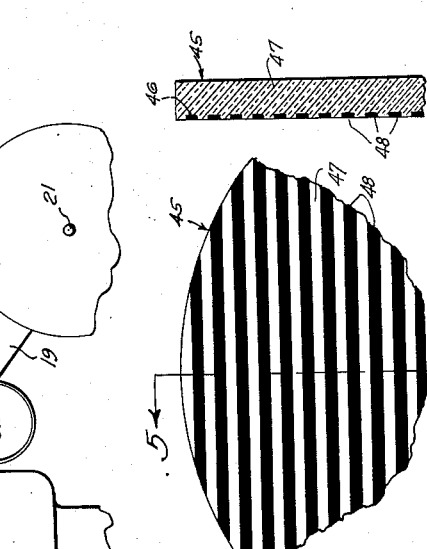
INVENTOR.
Leigh Gould
BY
Barthel & Bugbee
ATTYS Patented May 25, 1954

2,679,188

UNITED STATES PATENT OFFICE 2,679,188

DEPTH ILLUSION ATTACHMENT DEVICE FOR OPTICAL PROJECTORS

Leigh Gould, Detroit, Mich.

Application August 30, 1949, Serial No. 113,174

1 Claim. (Cl. 88—24)

This invention relates to optical projectors and, in particular, to attachments for such projectors.

One object of this invention is to provide a device for use with the projection lens of an optical projector, such as for motion picture film, which will give the observer a three-dimensional impression of depth.

Another object is to provide a device for use with the projection lens of an optical projector consisting of closely spaced parallel elongated opaque objects such as wires, which when placed in front of the projection lens system alters the appearance of the image seen on the screen and gives to the observer the effect of causing the image to move forward from the screen.

Another object is to provide a device for use with the projection lens of an optical projector, as set forth in the preceding object, wherein the dark portions of the image appear to be separated and brought forward from the light portions of the image, thereby giving a three-dimensional impression of depth to the observer.

In the drawings:

Figure 1 is a front elevation, partly in section, of a device for use with the projection lens of an optical projector, according to a preferred form of the invention;

Figure 2 is a horizontal section along the line 2—2 in Figure 1;

Figure 3 is a vertical section along the line 3—3 in Figure 1;

Figure 4 is an enlarged fragmentary front elevation of a modified device for the same purpose;

Figure 5 is a vertical section along the line 5—5 in Figure 4;

Figure 6 is a view similar to Figure 5, but showing a further modification; and

Figure 7 is a diagrammatic view of an optical motion-picture projector showing the device of the present invention attached to the projection lens and viewed in vertical section.

Referring to the drawings in detail, Figures 1 to 3 and 7 show a device generally designated 10, which is adapted to be attached to the barrel 11 of the projection lens system 12 of an optical projector, generally designated 13. The latter is conventional and any type of projector may be used. The projector shown consists of a lamp house 14 supported on a pedestal 15 connected to a base (not shown). The lamp house 13 contains a socket 16 in which is mounted a projection lamp bulb 17 which is wired to the usual source of electric current, such as a house lighting line. Arms 18 and 19 lead upward and downward from the lamp house 13 and support shafts 20 and 21 upon which are mounted the film spools 22 and 23 which accommodate the motion-picture film 24 being projected.

The motion picture film 24 is fed by means of sprocket wheels 25 and 26 on shafts 27 and 28 to film guides 29 and 30 in front of the condensing lens 31, and in line with the axis of the projection lens system 12. A conventional intermittent feed mechanism (not shown), such as an intermittently operated claw or pawl, feeds the film past the guides 29 and 30 or film gate in a rapidly intermittent manner. The sprocket shafts 27 and 28 and usually the spool shaft 21 are driven in order to properly feed the film to and from the intermittent feed mechanism. Guide rollers 32 are positioned adjacent the sprockets 26 and 27 to further guide the film 24 and to assist in forming the proper loops on opposite sides of the film gates or guides 29 and 30. The usual reflector 33 is mounted behind the projection lamp bulb 17 to direct rays into the condenser 31 and thence through the film 24 to the projection lens system 12.

The device 10 of the present invention consists of a tubular barrel 34 having an inner bore 35 of substantially the same diameter as the outer diameter of the lens barrel 11 so as to slip smoothly thereon and be frictionally held. The forward end of the barrel 34 is flanged as at 36 and behind the flange 36 is a reduced diameter bore 37. Behind the bore 37 is a threaded portion 38 which receives a correspondingly threaded retaining ring 39. Mounted between the retaining ring 39 and the flange 36 and held in place thereby is a mounting ring 40. Embedded in the mounting ring 40 is an alternately opaque and transparent screen 41 consisting of a large number of small diameter opaque rods or wires 42 separated from one another by minute spaces 43.

The screen 41, for example, may include wires of approximately 1/64 of an inch in diameter and spaced apart from one another by intervals of 1/64 of an inch. In general, the arrangement of 32 wires per inch is found to be satisfactory. The wires 41 are preferably molded in position at the time the ring 40 is formed, but may also be inserted in suitable aligned holes 44.

The modified alternately opaque and transparent screen 45 shown in Figures 4 and 5 is similar in purpose to the screen 41 shown in Figures 1 to 3 inclusive and is similarly mounted. The screen 45 however, is formed by providing parallel grooves 46 of approximately rectangular cross-section in a transparent plate or disc 47 of glass, transparent plastic or the like. These grooves 46 are of the same order of width and spacing as the wires 42 and spaces 43 of Figures 1 to 3 inclusive, but are formed by filling the grooves with opaque material to form opaque bands 48 corresponding to the opaque wires 42. The disc 47 is, of course, mounted in the portion 37 of the barrel 34 in place of the mounting ring 40.

The modified alternately opaque and transparent screen 50 shown in Figure 6 is generally similar to that shown in Figures 4 and 5 except that the grooves 51 in the transparent plate or disc 52 are of approximately semi-circular cross-section. The grooves 51 are filled with opaque material to form bands 53 in the same manner and with similar widths and separations as the bands 48 in Figure 5. The modified screen 50 is also similarly mounted in the portion 37 of the barrel 34 in place of the mounting ring 49, and held in position by the retaining ring 39.

In the operation of the invention, the device 10, either with the screen 41 of Figures 1 to 3 inclusive, or the screens 45 or 50 of Figures 4 to 6, is slipped over the lens barrel 11. The projection lens 12 is then focussed on the projection screen and the projector 13 operated in the usual manner. The device 10, however, gives the effect to the observer, of making the image move forward from the screen. In particular, the device seems to separate the light-colored portions from the dark-colored portions of the image and brings the dark-colored portions forward from the light-colored portions. In this manner, the device gives the observer a three-dimensional impression of depth to the image which he sees upon the screen. The effect is apparently due to a diffraction phenomenon.

What I claim is:

In combination in an optical film-projection arrangement, a projection screen adapted to receive a greatly-magnified projected image, a film projector disposed remote from said screen, said film projector having a light source, a film holder for the film of which an image is to be projected onto said projection screen, and a projection lens system disposed on the opposite side of said film holder from said light source for projecting said image onto said screen; and a line screen device disposed closely adjacent said projection lens system on the screen side thereof, said device comprising a support having an aperture aligned with said projection lens system and a multiplicity of minutely-spaced elongated opaque parallel bands of substantially equal widths disposed in laterally-spaced relationship across said aperture in a plane substantially perpendicular to the optical axis of said projection lens system, the widths of said bands being approximately one sixty-fourth of an inch and the axial thicknesses of said bands not substantially exceeding their widths.

References Cited in the file of this patent

UNITED STATES PATENTS

| Number | Name | Date |
|---|---|---|
| 817,569 | Ives | Apr. 10, 1906 |
| 1,003,064 | Phillips | Sept. 12, 1911 |
| 1,154,232 | Byron | Sept. 21, 1915 |
| 1,271,667 | Coleman | July 9, 1918 |
| 1,370,885 | Frederick et al. | Mar. 8, 1921 |
| 1,438,013 | Benson | Dec. 5, 1922 |
| 1,627,892 | Frederick | May 10, 1927 |
| 1,787,808 | Wittel | Jan. 6, 1931 |
| 1,833,634 | Brosse | Nov. 24, 1931 |
| 1,848,253 | Howell | Mar. 8, 1932 |
| 2,029,300 | Arfsten | Feb. 4, 1936 |

FOREIGN PATENTS

| Number | Country | Date |
|---|---|---|
| 4,480 | Great Britain | of 1912 |